US011924615B2

(12) United States Patent
Hasani et al.

(10) Patent No.: US 11,924,615 B2
(45) Date of Patent: Mar. 5, 2024

(54) HEARING AID, ANTENNA FOR A HEARING AID, AND METHOD FOR PRODUCING A HEARING AID

(71) Applicant: Sivantos Pte. Ltd., Singapore (SG)

(72) Inventors: Hamed Hasani, Erlangen (DE); Oliver Nipp, Eckental (DE)

(73) Assignee: Sivantos Pte. Ltd., Singapore (SG)

(*) Notice: Subject to any disclaimer, the term of this patent is extended or adjusted under 35 U.S.C. 154(b) by 62 days.

(21) Appl. No.: 17/682,071

(22) Filed: Feb. 28, 2022

(65) Prior Publication Data

US 2022/0279293 A1 Sep. 1, 2022

(30) Foreign Application Priority Data

Mar. 1, 2021 (DE) ..................... 10 2021 201 909.9

(51) Int. Cl.

*H04R 25/00* (2006.01)
*H01Q 1/27* (2006.01)
*H01Q 1/38* (2006.01)

(52) U.S. Cl.

CPC ........... *H04R 25/609* (2019.05); *H01Q 1/273* (2013.01); *H01Q 1/38* (2013.01); *H04R 25/554* (2013.01); *H04R 25/65* (2013.01); *H04R 2225/023* (2013.01); *H04R 2225/51* (2013.01); *H04R 2460/17* (2013.01)

(58) Field of Classification Search

CPC .......... H04R 2225/023; H04R 2225/51; H04R 2460/17; H04R 25/554; H04R 25/609; H04R 25/65

USPC .......................................................... 381/315

See application file for complete search history.

(56) References Cited

U.S. PATENT DOCUMENTS

| | | | |
|---|---|---|---|
| 2010/0158295 A1 | 6/2010 | Polinske et al. |
| 2017/0055088 A1 | 2/2017 | Rabel et al. |
| 2019/0166437 A1 | 5/2019 | Adel et al. |
| 2019/0320270 A1 | 10/2019 | Ozden |
| 2020/0314566 A1 | 10/2020 | Perri et al. |

FOREIGN PATENT DOCUMENTS

| | | |
|---|---|---|
| EP | 2725655 A1 | 4/2014 |
| EP | 3133839 A1 | 2/2017 |
| EP | 3185583 A1 | 6/2017 |
| EP | 3038382 B1 | 2/2020 |
| EP | 3110174 B1 | 2/2021 |

*Primary Examiner* — Phylesha Dabney

(74) *Attorney, Agent, or Firm* — Laurence A. Greenberg; Werner H. Stemer; Ralph E. Locher

(57) ABSTRACT

A hearing aid has a housing and an antenna. The housing has a housing shell to be worn in the ear. The antenna is designed for signal transmission via a radio connection. The housing shell has an inner side. The antenna is inserted into the housing shell and extends along the inner side. There is also described a corresponding antenna and a method for producing a corresponding hearing aid.

13 Claims, 6 Drawing Sheets

HEARING AID, ANTENNA FOR A HEARING AID, AND METHOD FOR PRODUCING A HEARING AID

CROSS-REFERENCE TO RELATED APPLICATION

This application claims the priority, under 35 U.S.C. § 119, of German Patent Application DE 10 2021 201 909.9, filed Mar. 1, 2021; the prior application is herewith incorporated by reference in its entirety.

FIELD AND BACKGROUND OF THE INVENTION

The invention relates to a hearing aid, to an antenna for the hearing aid, and to a method for producing such a hearing aid.

A hearing aid is typically used to output an audio signal to a user of the hearing aid. The output is effected by way of an output transducer, usually acoustically via airborne noise by means of a so-called receiver, which is also referred to as a loudspeaker. A special design of a hearing aid is used to care for a user with a hearing deficit. For this purpose, the hearing aid has at least one acoustic input transducer, typically a microphone, and a control unit. The control unit is designed to process an input signal, which is generated by the input transducer from ambient sound, and thus to at least partially compensate for the hearing deficit of the user. A variant is also conceivable in which the output transducer is designed for the mechanical or electrical coupling of the audio signal into the sense of hearing of the user (for example a cochlear implant). In the context, the generic term "hearing aid" also includes devices such as so-called tinnitus maskers, headsets, headphones, and the like, for example.

A hearing aid typically has an earpiece, which is inserted into an auditory canal of the user and then closes it in relation to the surroundings. In other words: the earpiece is worn in the ear. In certain designs, for example, CIC devices (CIC: "completely in-the-canal"), the hearing aid itself is conceived as an earpiece as a whole and then has a housing which is worn in the ear. Due to the very small structural form of hearing aids in general, especially in conjunction with the earpiece, the size of which is restricted by the auditory canal, the installation space for housing the various components of the hearing aid is very restricted. This is particularly problematic if the hearing aid has an antenna, for signal transmission via a radio connection, for example, with another hearing aid or an auxiliary device. Any installation space restriction also restricts the design freedom and the transmission properties of an antenna.

SUMMARY OF THE INVENTION

Against this background, it is the object of the invention to specify a hearing aid having an improved antenna and such an antenna. The antenna is to have the most advantageous possible transmission properties and is to utilize the available installation space in the hearing aid as optimally as possible. It is a further object to provide a method for producing such a hearing aid.

With the above and other objects in view there is provided, in accordance with the invention, a hearing aid, comprising:

a housing having a housing shell to be worn in an ear of a user;

an antenna disposed in said housing shell;

said antenna being configured for signal transmission via a radio connection;

said housing shell having an inner side; and said antenna being inserted into said housing shell and extending along said inner side of said housing shell.

In other words, the objects of the invention are achieved by a hearing aid with the above features, by a corresponding antenna, and by a method for producing the hearing aid.

The hearing aid has a housing and an antenna. The housing has a housing shell, which is also referred to as a "shell." The housing shell is used to be worn in the ear, i.e., when the hearing aid is used as intended, the housing shell is inserted into the auditory canal of a user. The specific position inside the auditory canal is dependent on the specific structural form of the hearing aid. The human auditory canal in general has two curves, the outer curve is also referred to as the first curve, the curve located farther inward in the direction of the eardrum is also referred to as the second curve. Depending on the structural form of the hearing aid, it is arranged at different points along the auditory canal when it is used as intended or even partially or completely outside the auditory canal.

The housing furthermore in particular has a cover plate, which is also referred to as a "faceplate" and which closes the housing shell. The cover plate faces out of the auditory canal when used as intended and suitably has an interface, for example, one or more control elements, for operating the hearing aid. Moreover, the cover plate is preferably removable, for example pivotable, to open the housing and to reach the interior of the hearing aid, for example, to change a battery. The cover plate is attached to the housing shell, both jointly form the housing of the hearing aid.

The antenna is designed for signal transmission via a radio connection. The specific design of the radio connection is initially incidental, it is essential that the antenna is designed for signal transmission. The radio connection is, for example, a Bluetooth connection, Wi-Fi connection, RF connection, or the like, the antenna is then accordingly a Bluetooth, Wi-Fi, RF, or other antenna. The antenna is in particular bidirectional, i.e., both a transmitting antenna and a receiving antenna. The radio connection exists, for example, with another hearing aid, for example another individual device of a binaural hearing aid having two individual devices, or with an auxiliary device, e.g., a smartphone, a television, or a remote control. In operation, the antenna generally emits electromagnetic radiation and/or receives it, especially via a transmitting and receiving point of the antenna. The transmitting and receiving point is also referred to as an excitation point. The frequency range of the radiation is dependent on the specific embodiment of the radio connection for which the antenna is designed.

The housing shell has an inner side, with an inner surface. The inner side of the housing shell faces inward, thus into the inside of the housing, and encloses an interior of the housing. One or more components of the hearing aid are housed in this interior, in particular at least one microphone, a receiver, a battery, or a control unit or a combination thereof.

The antenna is inserted into the housing shell and extends along the inner side, preferably along the inner surface and substantially flush with the inner surface. In particular, the antenna then follows an inside profile of the housing shell. The antenna preferably presses against the inner side of the housing shell, thus clings to it uniformly, preferably completely, i.e., in particular not solely in sections. The antenna suitably presses in a form-fitting manner against the inside of the housing shell, i.e., against its inner surface. In particular, the antenna is applied optimally to the housing shell and follows it. The antenna in particular forms a separate layer or ply inside the housing shell and along the inner side of the housing shell.

The special embodiment and arrangement of the antenna enables an optimal installation space utilization. The antenna is not in the way of the remaining components inside the housing, but rather in particular extends around them. At the same time, a maximum area for the antenna is provided by the arrangement of the antenna along the inner side, so that the antenna can be dimensioned to be particularly large and high-performance. In addition, the antenna can also be designed particularly freely due to its special arrangement, so that greatly varying antenna types are implementable. In addition, the antenna in the interior of the housing is in particular the component located farthest outward, i.e., all other components inside the housing shell are also enclosed by the antenna. The antenna therefore more or less forms a partition layer between housing shell and other components therein. The antenna is thus well accessible to signals from or to the outside and the radio connection is accordingly minimally disturbed by the remaining components in the housing shell.

During the production, the antenna is simply inserted into the housing shell. This is particularly simple and cost-effective. The antenna is in particular not just integrated into the housing shell, so that a complex multicomponent injection molding method or method for integrating the antenna into the housing shell is not necessary. In one possible embodiment, the insertion is in particular reversible, i.e., the antenna is also removable from the housing shell again and separable therefrom in a simple manner.

The antenna is preferably an independent component, which is inserted into the housing shell. The antenna is thus in particular produced separately from the housing shell, i.e., the housing shell and the antenna are produced independently of one another and then assembled. For example, the housing shell is produced as an injection molded part independently of the antenna. The antenna is in particular not manufactured or connected monolithically with the housing shell, but rather is fundamentally independent of the housing shell. This significantly facilitates the manufacturing, because the antenna is produced separately as a simple component and then only inserted if needed into the housing shell.

The housing shell is preferably a standard component, for mass production. The housing shell is suitable in principle for use in various auditory canals and accordingly is in particular not a component produced individually for a single user. For example, the housing shell is a so-called "one-size-fits-all/most" component. The antenna is preferably also a standard component, the above statements apply accordingly.

The hearing aid is used in particular to output an audio signal to a user of the hearing aid. The output takes place by means of an output transducer, preferably by means of a receiver. The hearing aid is preferably designed to care for a user having a hearing deficit and for this purpose has at least one acoustic input transducer, preferably a microphone, and a control unit. The control unit is designed to process an input signal, which is generated by the input transducer from ambient sound, and to output it via the output transducer to thus at least partially compensate for the hearing deficit of the user. The general term "hearing aid" also additionally includes devices such as so-called tinnitus maskers, headsets, headphones, and the like, for example, however, a hearing aid to care for a user having a hearing deficit is presumed hereinafter without restriction of the generality.

The hearing aid is preferably a CIC device or an IIC device. The abbreviations CIC and IIC identify two particularly compact structural forms of hearing aids. In the case of a CIC device (CIC="completely in the canal"), the hearing aid is inserted into the auditory canal in such a way that the housing ends toward the outside in the outer part of the auditory canal. The hearing aid is thus hardly visible from the outside. In the case of an IIC device (IIC="invisible in the canal"), the hearing aid is inserted even deeper than a CIC device into the auditory canal, in particular into the region of the second curve of the auditory canal, thus even behind the first curve, so that the hearing aid is no longer visible from the outside. In comparison to these two structural forms, for example, an ITC device (ITC="in the canal") is inserted into the auditory canal, but only at its beginning, and otherwise also fills up the pinna, which offers significantly more space in comparison to the auditory canal. A BTE device (BTE="behind the ear") enables even more installation space, in which the housing is worn completely outside the auditory canal and behind the ear, and in which only a sound tube leads into the auditory canal or a line, which leads to a receiver, which is inserted into the auditory canal. Two specific problems result in particular in the case of CIC and IIC devices, firstly the installation space in the housing is significantly restricted by the dimensions of the auditory canal, secondly the transmission of signals from the auditory canal is made significantly more difficult due to the surrounding head of the user than a transmission which takes place from outside the ear or the pinna. The special antenna described here is therefore particularly advantageous for CIC and IIC devices.

In one suitable embodiment, the antenna is designed as a flexible printed circuit board having a conductor track structure. The flexible printed circuit board is also referred to as a "flex PCB" (PCB="printed circuit board"). The flexible printed circuit board has a carrier layer which is sufficiently thin to be flexible. The carrier layer is preferably between 20 μm and 200 μm thick for this purpose. The printed circuit board is preferably also flexibly elastic. The printed circuit board is in particular also reversibly deformable. The conductor track structure implements those electrical properties of the printed circuit board which are required for an antenna. The conductor track structure is therefore also referred to as an antenna structure. The conductor track structure is applied to the carrier layer or embedded therein. The conductor track structure in particular consists of a conductive material or a combination of conductive materials, for example in general a metal or especially copper. A flexible printed circuit board is very particularly suitable as an antenna, since such a printed circuit board is producible in a simple manner and in particular as planar and will also thus be produced and is then suitably folded easily to finally be inserted into the housing shell. Separate fasteners are initially not necessary as such and are absent in one advantageous embodiment, in another embodiment, the printed circuit board is additionally fastened, for example on the housing and/or on a component therein. The printed circuit board is, for example, soldered, adhesively bonded, or plugged or the like. In the inserted state, the conductor track structure preferably faces outward and is thus located between the carrier layer and the inner side, so that the conductor track structure is optimally protected. However, an inverted arrangement in which the conductor track structure faces inward is also possible and is suitable in principle.

In another suitable embodiment, the antenna is a wire or a stamped part, produced from a conductive material. The wire is accordingly brought into shape suitably to implement an antenna. The wire is in particular a metal wire. This applies similarly to the stamped part, which is stamped out in a suitable shape to implement an antenna. The stamped part is, for example, stamped out of a metal foil or metal-coated film. The wire or the stamped part then in particular replaces the above-mentioned conductor track structure and in particular also does not require an additional carrier layer. The wire or the stamped part emulates the above-described conductor track structure and is thus identical thereto in shape. The statements on the conductor track structure accordingly apply similarly to a wire or a stamped part.

To implement an antenna, the same shape is suitable in principle for the conductor track structure, the wire, and the stamped part, the respective antennas essentially differ due to the different production. In principle, a conductor track structure, a wire, and/or a stamped part can be combined with one another as desired, so that different parts of the antenna are then produced in different ways and designed differently.

The housing shell is fundamentally formed like a shell, having a base, which extends when used as intended into the auditory canal, and having an opening, which faces outward and is in particular closed using the cover plate. For general adaptation to the auditory canal, the housing shell is formed tapered in the direction of the base. In particular, a sound outlet is arranged at the base, for example a hole, via which sound is output from the receiver in the direction of the eardrum. In this meaning, the housing shell is then roughly formed like a tunnel, having a tapering diameter. Viewed in cross section, the housing shell is then designed to be ring-shaped, wherein the cross section is not necessarily circular, rather "ring-shaped" is to be understood more generally as a closed loop. In any case, the housing shell and thus also its inner side are formed bent or curved, thus have a bent profile. To follow this bent profile of the housing shell, the antenna is bent at least once and thus in particular adapted to a bend or curve of the inner side. The antenna thus not only extends in a small and possibly planar sub-section along the housing shell, but rather is dimensioned so that a bend or curve is also covered. The antenna preferably even extends completely around the interior and is accordingly guided around for this purpose one time completely along the inner side.

In one particularly suitable embodiment, the antenna is folded into a funnel shape to extend along the housing shell. The antenna is more or less rolled up from a planar state to form a funnel in this case and then inserted into the housing shell. The antenna is generally suitably formed in a strip shape, preferably U-shaped, having two ends, which are guided toward one another during the folding and then possibly also overlap. In particular, the antenna extends at most once around the interior, and is thus in particular not folded in multiple plies. In general, the folded antenna then has two openings which face approximately in the direction of the auditory canal. One opening faces in the direction of the housing shell, the other in the direction of the base of the housing shell. Since the antenna follows the housing shell, the antenna also roughly follows an inner wall of the auditory canal in the inserted state of the hearing aid.

In one suitable embodiment, the antenna is arranged completely inside the housing shell. The antenna thus in particular does not protrude out of the housing and in particular is also not visible from the outside. The antenna is thus advantageously concealed.

In one expedient embodiment, the antenna is a dipole antenna, having two arms which each form one antenna pole. The antenna poles are used to transmit and/or receive signals. The two arms are each manufactured from an electrically conductive material.

In a first suitable embodiment, a capacitance is formed on each of the arms at the end. The antenna is then a dipole antenna having capacitive load. The two capacitances are each in particular formed by a capacitor which is connected to the respective arm. The antenna is preferably a folded dipole. For this purpose, a respective arm is formed from two conductors which extend adjacent to one another. The two conductors are in particular approximately equal in length (i.e., at most 20% difference). One of the two conductors of the arm begins at the transmitting and receiving point of the antenna and ends at the capacitance, the other of the two conductors begins at the capacitance and ends at a corresponding conductor of the other arm. The other arm having capacitance is designed similarly thereto. A respective capacitance is expediently formed U-shaped, having a middle leg, starting from which two side legs extend. The two conductors of an arm are then connected to the middle leg. The two side legs each extend in the direction of the two conductors, in particular in parallel thereto, and on opposite sides of the two conductors, so that the two conductors are located at the ends between the side legs. This applies similarly to the other arm.

In a second suitable embodiment, an inductance is formed on each of the arms at the end. The antenna is then a dipole antenna having inductive load. Preferably, a respective arm is formed from a single conductor having a meandering profile, so that the respective arm forms an inductance at the same time. The inductance suitably has 5-10 bends (also referred to as "turns" in English). This applies similarly to the other arm. The two arms are in particular galvanically isolated from one another and run together at a transmitting and receiving point of the antenna. This transmitting and receiving point also marks a point of the least distance of the two conductors to one another.

The arms each in particular follow the in particular strip-shaped profile of the antenna, so that in the inserted state, the arms accordingly extend around the interior of the housing shell. The two arms and the two capacitances or inductances are preferably mirror symmetrical to one another. A nonsymmetrical embodiment is also suitable in principle, however, in this case the antenna expediently also has a symmetry element (also referred to as a balun).

In another expedient embodiment, the antenna is a frame antenna (also referred to as a "loop antenna" in English), having two arms, which run together on a first side to form the transmitting and receiving point and which are connected on a second side, which is opposite to the first side, to a capacitance. The capacitance is in particular formed by a capacitor, having two electrodes, each one of which is connected to one of the arms. In particular a uniform power distribution is achieved within the antenna by means of the capacitance. In a particularly simple embodiment, the capacitance is simply formed by two opposing ends of the arms and a gap located in between. In another embodiment, the capacitance is formed as a single ply, having two electrodes which are located jointly in one ply of the antenna and each have multiple fingers, wherein the fingers of the two electrodes intermesh (also referred to as a "interdigital capacitor" in English). In a further, different embodiment, the capacitance is formed as two plies, having two electrodes which are arranged in different plies of the antenna. One of the electrodes is then expediently connected by means of a through contact (so-called "via") to one of the arms. Especially if the antenna is a printed circuit board or the like, it has an upper side and a lower side which each form one ply of the printed circuit board. The through contact then extends through the carrier layer and connects the two plies.

Independently of the embodiment of the antenna, its two arms are expediently jointly located in one plane or also ply. This is particularly simple to implement in manufacturing, especially in the case of a printed circuit board or the like. Also independently of the embodiment of the antenna, the respective possibly used capacitances or inductances are each either embodied as a separate component, which is inserted into the antenna, or are already integrated therein during its production, for example printed on.

As an alternative to an antenna which is arranged completely inside the housing shell, in one advantageous embodiment the antenna has a first arm and a second arm, wherein only the first arm is arranged inside the housing shell. In contrast, the second arm is formed along a pullout aid of the housing, for example integrated in the pullout aid, for pulling the housing out of the ear. For both arms, but particularly for the first arm, the statements above apply accordingly, in particular the statements on arms, capacitances, and inductances. The pullout aid is, for example, a thread or handle, for example made of plastic, and extends outward and away from the housing, so that the pullout handle can be grasped by the user in the inserted state to then pull the entire hearing aid out of the auditory canal by pulling. The pullout aid thus represents a type of boom and is therefore particularly suitable for housing at least a part of the antenna. The pullout aid is expediently rigid for this purpose. The antenna which has an arm along the pullout aid is typically a nonsymmetrical antenna, in which the two arms are in particular excited differentially, and then expediently has a symmetry element to improve the transmission properties. The second arm is, for example, a single wire or is printed as a conductor track on the pullout aid or is applied in another way to the pullout aid or integrated therein.

The antenna having an arm along the pullout aid is designed either as a dipole antenna or as a monopole antenna. In an embodiment as a monopole antenna, the first arm is suitably designed as a ground surface and forms a ground potential, so that the antenna is a monopole antenna having the second arm as an antenna pole. In this case, in particular a symmetry element is not necessary, therefore such an element is expediently omitted. Since the ground surface is arranged inside the housing shell, it in particular also forms an advantageous shielding layer around the remaining components, which are arranged inside the housing shell, so that these components are shielded against interference from the outside. The ground surface is preferably designed in such a way that it has two ends, which are connected to one another in the inserted state of the antenna, so that the ground surface is formed ring-shaped or tunnel-like.

The above statements in conjunction with the hearing aid also apply accordingly to the antenna and to the method and vice versa. Other specific features which are considered as characteristic for the invention are set forth in the appended claims.

Although the invention is illustrated and described herein as embodied in a hearing aid, an antenna for a hearing aid, and a method for producing a hearing aid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
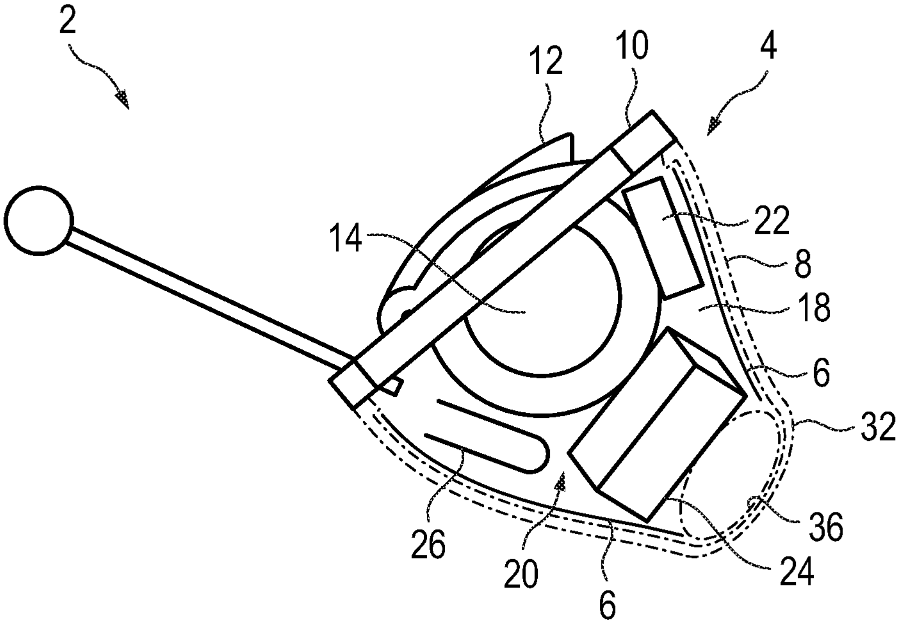
FIG. 1 is a diagrammatic view a hearing aid.

Referring now to the figures of the drawing in detail and first, in particular, to FIG. 1 thereof, there is shown a hearing aid 2, which is a CIC device here by way of example. The statements made here also apply similarly to other hearing aid types. The hearing aid 2 has a housing 4 and an antenna 6. The antenna 6 is only shown in cross section in FIG. 1. The housing 4 has a housing shell 8, which is also referred to as a "shell". An exemplary embodiment of the housing shell 8 and the antenna 6 from FIG. 1 is shown in different perspective views in FIGS. 2-4; the special shape of the antenna 6 is also clear therefrom. The housing shell 8 is used to be worn in the ear, i.e., when the hearing aid 2 is used as intended, the housing shell 8 is inserted into the auditory canal of a user.

The housing 4 furthermore has a cover plate 10, which is also referred to as a "faceplate" and which closes the housing shell 8. When used as intended, the cover plate 10 faces out of the auditory canal and has, for example, an interface, for example one or more control elements 12, for operating the hearing aid 2. Moreover, the cover plate 10 is also removable, for example pivotable, to open the housing 4 and to allow access to the inside of the hearing aid 2, for example to change a battery 14. The cover plate 10 is attached to the housing shell 8, the two jointly form the housing 4 of the hearing aid 2.

The antenna 6 is designed for signal transmission via a radio connection. The specific embodiment of the radio connection is initially also incidental. Various exemplary embodiments of the antenna 6 are shown in FIGS. 5-8, 11 and 12. The antenna 6 is bidirectional in each case here, i.e., both a transmitting antenna and a receiving antenna. In operation, the antenna 6 generally emits electromagnetic radiation and/or receives it, especially via a transmitting and receiving point 16 of the antenna. The transmitting and receiving point 16 is also referred to as an excitation point.

The housing shell 8 has an inner side 18. The inner side 18 faces inward, into the inside of the housing 4, and encloses an interior 20 of the housing 4. One or more components of the hearing aid 2 are housed in this interior 20, for example, at least one microphone 22, a receiver 24, a battery 14, and a control unit 26 here.

Figure 2:
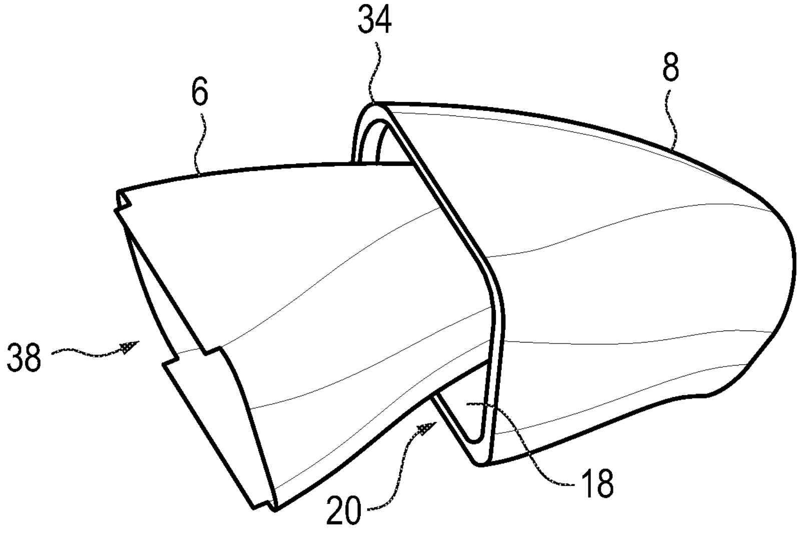
FIG. 2 shows a housing shell and an antenna of the hearing aid from FIG. 1.
Figure 3:
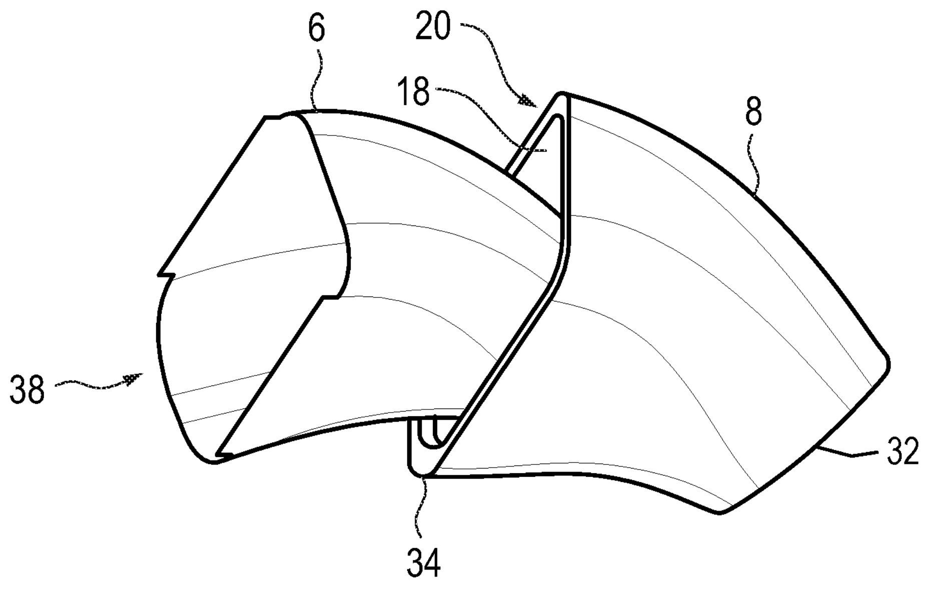
FIG. 3 shows another view of the housing shell and the antenna from FIG. 2.
Figure 4:
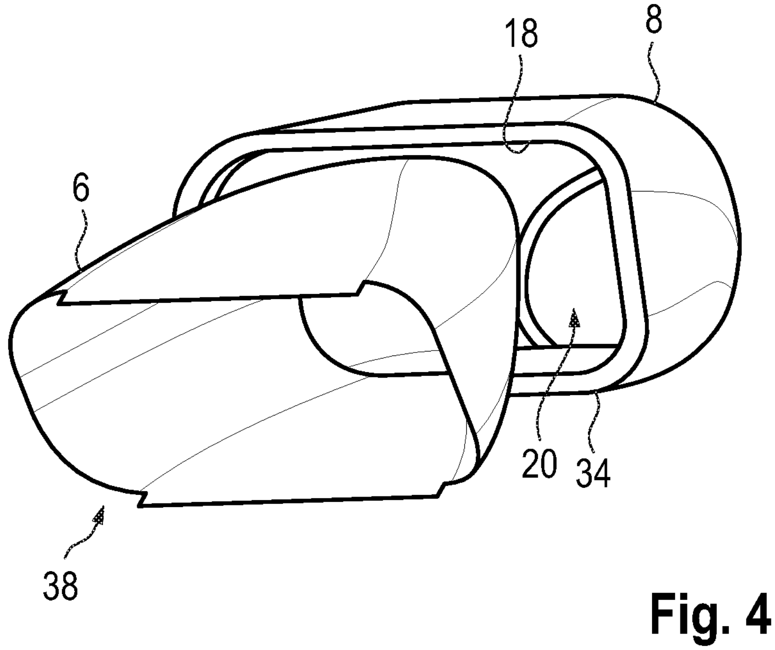
FIG. 4 shows still another view of the housing shell and the antenna from FIG. 2.

As can be seen from FIGS. 2-4, the antenna 6 is inserted into the housing shell 8 and extends along the inner side 18. Each of FIGS. 2-4 do not yet show the final state as in FIG. 1, but rather the insertion of the antenna 6 into the housing shell 8. The antenna 6 follows an inside profile of the housing shell 8 and presses against the inner side 18 of the housing shell 8 in the inserted state. In the present case, the antenna 6 presses in a form-fitting manner against the inside of the housing shell 8 and follows it. The antenna 6 moreover forms a separate layer or ply inside the housing shell 8 and along the inner side 18 and extends around the remaining components. The antenna 6 in the interior of the housing 4 is also the component located farthest outward, i.e., all other components inside the housing shell 8 are also enclosed by the antenna 6. This can be seen particularly well in FIG. 1. The antenna 6 thus more or less forms a partition layer between housing shell 8 and other components therein. The antenna 6 is also an independent component, which is inserted into the housing shell 8, in the exemplary embodiments shown. The antenna 6 is produced separately from the housing shell 8. The housing shell 8 is a standard component in the present case, for mass production, and is fundamentally suitable for use in various auditory canals and is accordingly in particular not a component produced individually for a single user.

The hearing aid 2 is used to output an audio signal to a user of the hearing aid. The output takes place by means of an output transducer, here by means of the receiver 24. The hearing aid 2 shown here is moreover especially designed to care for a user having a hearing deficit and for this purpose has at least one acoustic input transducer, the microphone 22 here, and the control unit 26, which is designed to process an input signal, which is generated by the input transducer from ambient sound, and output it via the output transducer, to thus at least partially compensate for the hearing deficit of the user. However, the statements made here also apply to other devices, e.g., so-called tinnitus maskers, headsets, headphones, and the like. The hearing aid 2 shown here is especially a CIC ("completely-in-canal") device, but the statements also apply similarly to an IIC ("invisible-in-canal") device and to other hearing aid types.

In the various embodiments shown here, the antenna 6 is designed as a flexible printed circuit board having a conductor track structure 28. The flexible printed circuit board is also referred to as a "flex PCB" (PCB="printed circuit board"). The flexible printed circuit board has a carrier layer 30, which is sufficiently thin to be flexible, for example, the carrier layer 30 is between 20 μm and 200 μm thick. The printed circuit board is also flexibly elastic and reversibly deformable. The conductor track structure 28 implements those electrical properties of the printed circuit board which are required for an antenna 6. The conductor track structure 28 is therefore also referred to as an antenna structure. The conductor track structure 28 is applied to the carrier layer 30 or embedded therein. The conductor track structure 28 consists here of a conductive material or a combination of conductive materials.

In one alternative, the antenna 6 is a wire or a stamped part, produced from a conductive material. The wire is accordingly brought into shape suitably to implement an antenna 6. This applies similarly to the stamped part, which is stamped out in a suitable shape to implement an antenna 6. The stamped part is stamped out, for example, from a metal foil or metal-coated film. The wire or the stamped part then replaces the above-mentioned conductor track structure 28 and also does not require an additional carrier layer. The wire or the stamped part emulates the described conductor track structure 28 here, is thus identical thereto in shape. The statements on the conductor track structure 28 accordingly apply similarly to a wire or a stamped part.

The same shape is fundamentally suitable for the conductor track structure 28, the wire, and the stamped part for implementing an antenna 6, the respective antennas 6 essentially differ due to the different production. In principle, a conductor track structure 28, a wire, and/or a stamped part can be combined with one another as desired, so that then different parts of the antenna 6 are produced in different ways and formed differently.

The housing shell 8 is fundamentally formed like a shell, having a base 32, which extends into the auditory canal when used as intended, and having an opening 34, which then faces outward and is closed using the cover plate 10. For general adaptation to the auditory canal, the housing shell 8 is formed tapered in the direction of the base 32. Moreover, a sound outlet 36 is arranged on the base 32, via which sound is output from the receiver 24 in the direction of the eardrum. In this meaning, the housing shell 8 is, roughly speaking, formed like a tunnel having a tapering diameter, as is also recognizable in FIGS. 2-4. Viewed in cross section, the housing shell 8 is then formed ring-shaped. Moreover, the housing shell 8 and thus also its inner side 18 are formed bent or curved, thus have a bent profile. To follow this bent profile of the housing shell 8, the antenna 6 is bent at least once and thus adapted to a bend or curve of the inner side 18. The antenna 6 thus not only extends in a small and possibly planar subsection along the housing shell 8, but rather is dimensioned so that a bend or curve is also covered. In the exemplary embodiments shown here, the antenna 6 even extends completely around the interior 18 and for this purpose is accordingly guided completely around along the inner side 18 once, as is recognizable particularly well in FIGS. 2-4.

Figure 5:
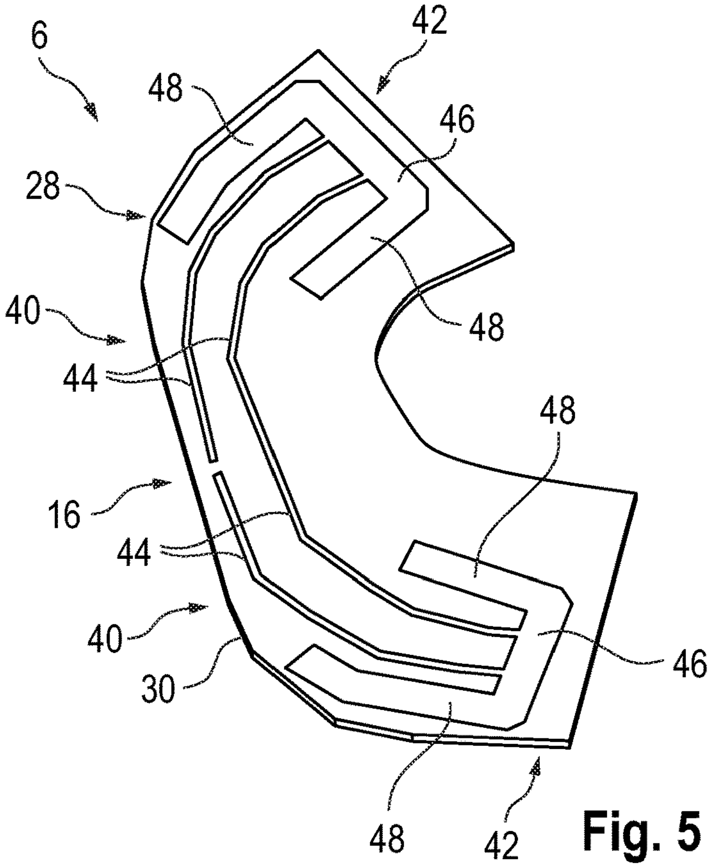
FIG. 5 shows a variant of the antenna from FIG. 2.
Figure 6:
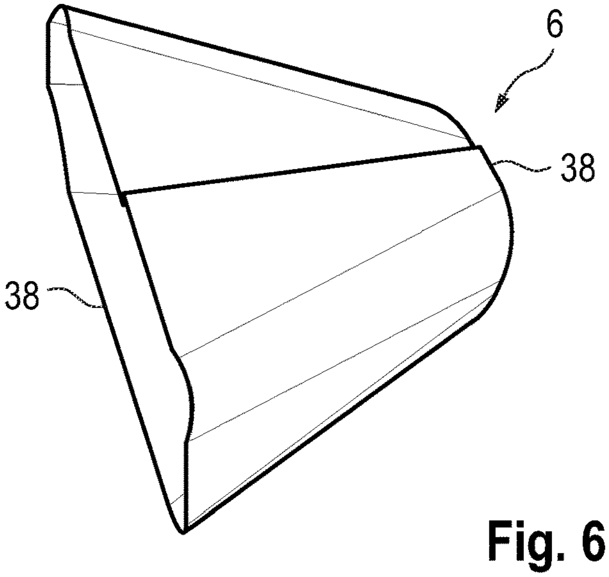
FIG. 6 shows the antenna from FIG. 5 in the assembled state.

Furthermore, it is evident from FIGS. 2-4 that the antenna 6 is folded into a funnel shape here in order to extend along the housing shell 8. The funnel shape of the antenna 6 is also recognizable in FIG. 6, in which the antenna 6 from FIG. 5 is shown in a folded state. The antenna 6 is more or less rolled together starting from a planar state as in FIGS. 5, 7, 8, 12 to form a funnel as in FIG. 6 and is then inserted into the housing shell 8. As can be seen from FIGS. 5, 7, 8 and 12, the antenna 6 is generally formed strip-shaped, even U-shaped here, having two ends which are guided toward one another during the folding and then possibly also overlap. The antenna 6 extends at most once around the interior 18, thus no longer being folded in multiple plies in particular. In general, the folded antenna 6 then has two openings 38, which face approximately in the direction of the auditory canal. One opening 38 faces in the direction of the opening 34 of the housing shell 8, the other in the direction of the base 32.

In the embodiments of FIGS. 1-8, the antenna 6 is arranged completely inside the housing shell 8. The antenna 6 thus in particular does not protrude out of the housing 4 and is also not visible from the outside.

Figure 7:
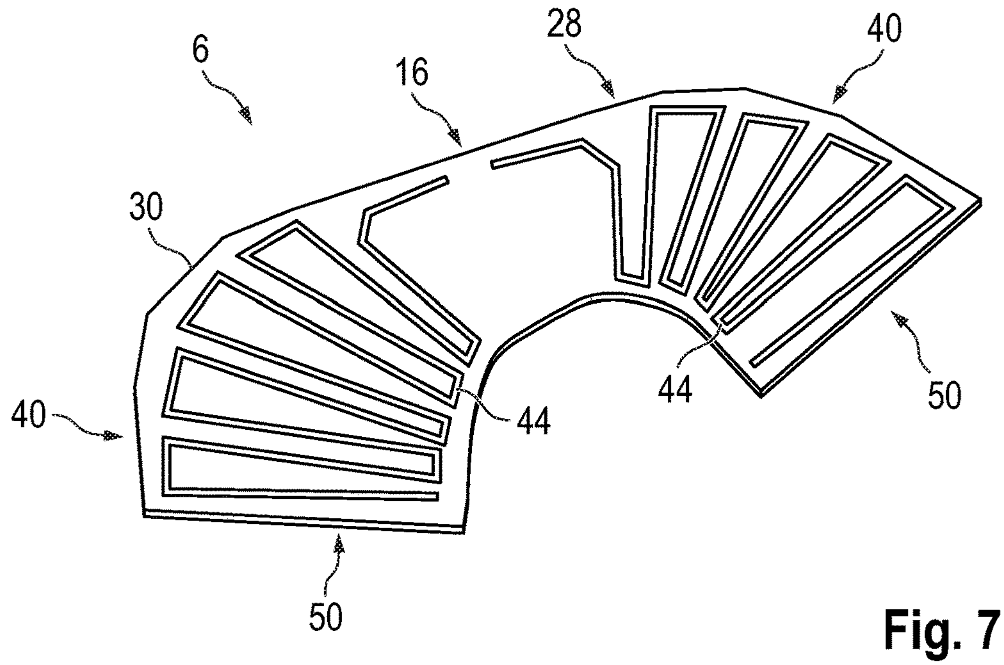
FIG. 7 shows a further variant of the antenna from FIG. 2.

In the embodiments of FIGS. 5 and 7, the antenna 6 is a dipole antenna, having two arms 40, each forming one antenna pole. The antenna poles are used for transmitting and/or receiving signals. The two arms 40 are each manufactured from an electrically conductive material.

In the embodiment of FIG. 5, a capacitance 42 or capacitive structure 42 is formed at the end of each of the arms 40, which are each formed here by a metal surface, which is attached to the respective arm 40, so that in each case a capacitor is formed in particular. The antenna 6 shown here is a folded dipole. For this purpose, a respective arm 40 is formed from two conductors 44, which extend adjacent to one another. The two conductors 44 are approximately equal in length (i.e., at most 20% difference). One of the two conductors 44 of the arm 40 begins at the transmitting and receiving point 16 and ends at the capacitance 42. The other of the two conductors 44 begins at the capacitance 42 and ends at a corresponding conductor 44 of the other arm 40. The other arm 40 having capacitance 42 is designed similarly thereto. A respective capacitance 42 is especially formed U-shaped here, having a middle leg 46, starting from which two side legs 48 extend. The two conductors 44 of an arm 40 are then attached to the middle leg 46. The two side legs 48 each extend in the direction of the two conductors 44, even in parallel thereto here, and on opposite sides of the two conductors 44, so that the two conductors 44 are located at the ends between the side legs 48. This applies similarly to the other arm 40. In FIG. 5, the conductors 44 and the capacitances 42 form a conductor track structure 28, which is applied to a carrier layer 30.

In the embodiment of FIG. 7, an inductance 50 or inductive structure 50 is formed at the end of each of the arms 40. In the present case, a respective arm 40 is formed from a single conductor 44, having a meandering profile, so that the respective arm 40 at the same time forms an inductance 50. In the present case, the inductance 50 has eight bends. The same applies similarly to the other arm 40. The two arms 40 are moreover galvanically isolated from one another and run together at the transmitting and receiving point 16 of the antenna 6, which also marks a point of the least distance of the two conductors 44 in relation to one another. In FIG. 7, the conductors 44, which are inductances 50 at the same time, form a conductor track structure 28, which is applied to a carrier layer 30.

In FIGS. 5 and 7, the arms 40 each follow the strip-shaped profile of the antenna 6, so that in the inserted state, the arms 40 accordingly enclose the interior 18 of the housing shell 8. The two arms 40 and the two capacitances 42 or inductances 50 are moreover mirror symmetrical to one another. A nonsymmetrical design is also possible in principle, however, in this case the antenna 6 optionally also has a symmetry element (not explicitly shown).

Figure 8:
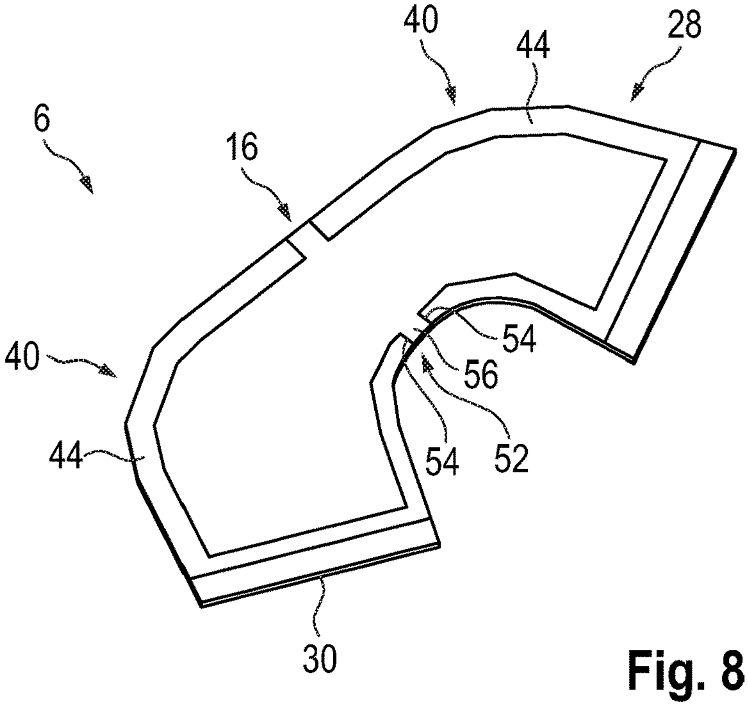
FIG. 8 shows a further variant of the antenna from FIG. 2.

Another embodiment is shown in FIG. 8, in which the antenna 6 is a frame antenna, having two arms 40, which run together on a first side to form the transmitting and receiving point 16 and which are connected on a second side, which is opposite to the first side, to a capacitance 52. The capacitance 52 is formed by a capacitor, having two electrodes 54, each of which is connected to one of the arms 40.

Figure 9:
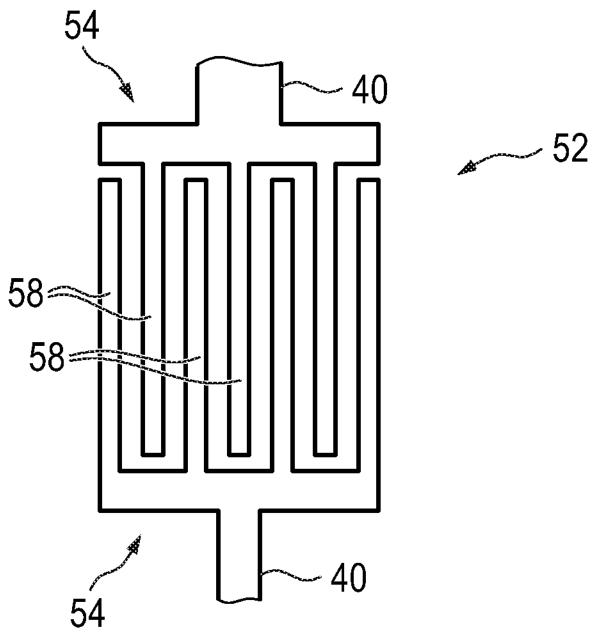
FIG. 9 shows a variant of a capacitance of the antenna from FIG. 8.
Figure 10:
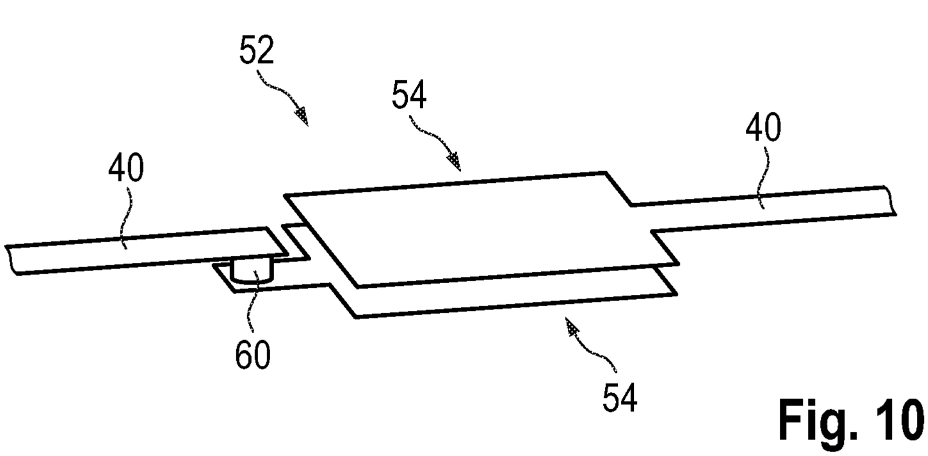
FIG. 10 shows a further variant of a capacitance of the antenna from FIG. 8.

In FIG. 8, the capacitance 52 is simply formed by two opposing ends of the arms 40 and an interposed gap 56. In FIG. 9, a variant of the capacitance 52 is shown, which is formed in a single ply here, having two electrodes 54 which are jointly located in one ply of the antenna 6 and each have multiple fingers 58, wherein the fingers 58 of the two electrodes 54 intermesh. In FIG. 10, a further variant of the capacitance 52 is shown, which is formed in two plies here, having two electrodes 54 which are arranged in different plies of the antenna 6. One of the electrodes 54 is then connected by means of a through contact 60 to one of the arms 40.

Independently of the embodiment of the antenna 6, its two arms 40 are located jointly in one plane or also ply in the exemplary embodiments shown. Also independently of the embodiment of the antenna 6, the capacitances 42, 52 or inductances 50 possibly used in each case are each either embodied as a separate component, which is inserted into the antenna 6, or—as shown here— is already integrated into the antenna 6 during its production, for example printed on.

Figure 11:
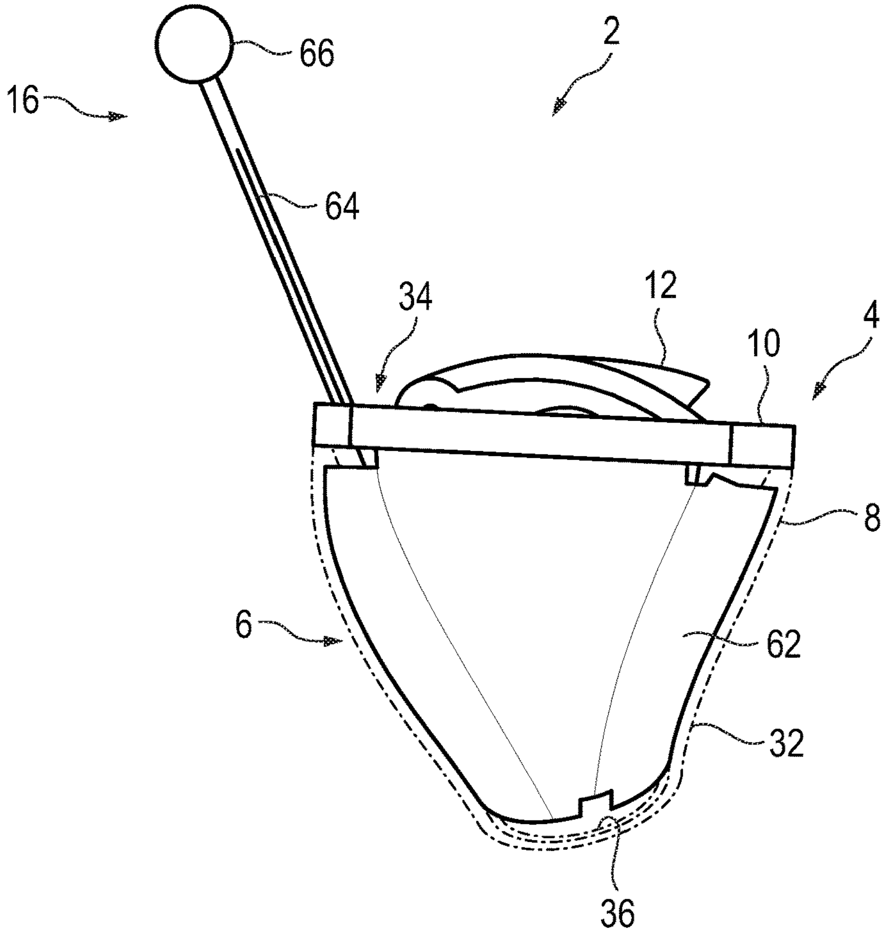
FIG. 11 shows the hearing aid from FIG. 1 with a further variant of the antenna from FIG. 2.
Figure 12:
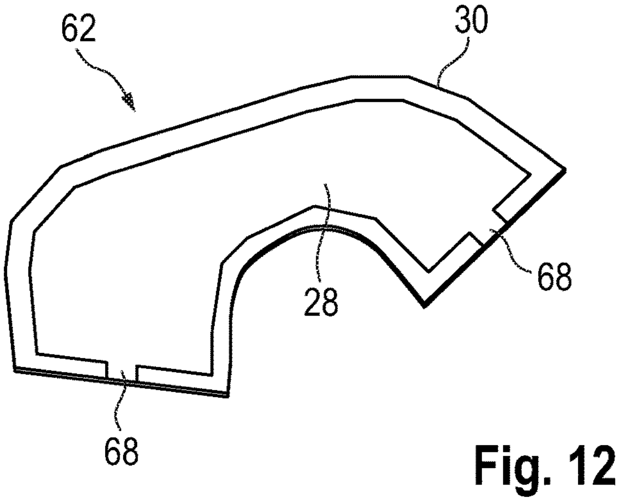
FIG. 12 shows an arm of the antenna from FIG. 11.

As an alternative to an antenna 6, which is arranged completely inside the housing shell 8, in an alternative embodiment, for example, as shown in FIGS. 11 and 12, the antenna 6 has a first arm 62 and a second arm 64, wherein only the first arm 62 is arranged inside the housing shell 8. In contrast, the second arm 64 is formed along a pullout aid 66 of the housing 4. For both arms 62, 64, but particularly for the first arm 62, primarily the statements above on the arms 40, capacitances 42, 52, and inductances 50 apply accordingly. The pullout aid 66 is, for example, a thread or handle, for example made of plastic, and extends toward the outside and away from the housing 4, so that the pullout aid 66 can be grasped by the user in the inserted state to then pull the entire hearing aid 2 out of the auditory canal by pulling. The antenna 6 is then a nonsymmetrical antenna 6 here. The second arm 64 is, for example, a single wire or is printed as a conductor track on the pullout aid 66 or is applied in another way to the pullout aid 66 or integrated therein.

The antenna 6 which has an arm 64 along the pullout aid 66 is formed either as a dipole antenna or as a monopole antenna. An embodiment as a monopole antenna is shown in FIGS. 11 and 12, an embodiment as a dipole antenna results, for example, upon combination with the statements on FIGS. 5, 7 and 8. In FIGS. 11 and 12, the first arm 62 is formed as a ground surface and forms a ground potential, so that the antenna 6 is then a monopole antenna, having the second arm 64 as an antenna pole. In this case, a symmetry element is not necessary. Since the ground surface is arranged inside the housing shell 8, it also forms a shielding layer around the remaining components, which are arranged inside the housing shell 8, so that these components are shielded against interference from the outside. As can be seen from the planar state of the ground surface shown in FIG. 12, it has two ends 68 here, which are connected to one another in the inserted state of the antenna 6, so that the ground surface is made ring-shaped or tunnel-like.

The following is a summary list of reference numerals and the corresponding structure used in the above description of the invention:

2 hearing aid
4 housing
6 antenna
8 housing shell
10 cover plate
12 control element
14 battery
16 transmitting and receiving point
18 inner side
20 interior
22 microphone
24 receiver
26 control unit
28 conductor track structure
30 carrier layer
32 base

34 opening (of the housing shell)
36 sound outlet
38 opening (of the antenna)
40 arm
42 capacitance
44 conductor
46 middle leg
48 side leg
50 inductance
52 capacitance
54 electrode
56 gap
58 finger
60 through contact
62 first arm
64 second arm
66 pullout aid
68 ends (of the ground surface)

The invention claimed is:

1. A hearing aid, comprising:
- a housing having a housing shell to be worn in an ear of a user;
- an antenna disposed in said housing shell;
- said antenna being a flexible printed circuit board having a conductor track structure and said antenna being configured for signal transmission via a radio connection;
- said housing shell having an inner side; and
- said antenna being inserted into said housing shell and extending along said inner side of said housing shell.

2. The hearing aid according to claim 1, wherein said antenna is an independent component, which is inserted into said housing shell.

3. The hearing aid according to claim 1, configured as a completely-in-the-canal device or as an invisible-in-the-canal device.

4. The hearing aid according to claim 1, wherein said antenna is bent at least once to follow a bent profile of said housing shell.

5. The hearing aid according to claim 1, wherein said antenna is folded in a funnel shape to extend along said housing shell.

6. The hearing aid according to claim 1, wherein said antenna is arranged completely inside said housing shell.

7. The hearing aid according to claim 1, wherein said antenna is a dipole antenna having two arms, and wherein a capacitance or an inductance is formed at the ends of each of said arms.

8. The hearing aid according to claim 1, wherein said antenna is a frame antenna having two arms, said two arms running together on a first side to form a transmitting and receiving point and being connected on a second side, opposite said first side, to a capacitance.

9. An antenna for a hearing aid according to claim 1.

10. A hearing aid, comprising:
- a housing having a housing shell to be worn in an ear of a user;
- an antenna disposed in said housing shell;
- said antenna being configured for signal transmission via a radio connection;
- said housing shell having an inner side; and
- said antenna being inserted into said housing shell and extending along said inner side of said housing shell; and wherein:
- said housing includes a pullout aid for pulling the housing out of the ear; and
- said antenna has a first arm arranged inside said housing shell and a second arm formed along said pullout aid.

11. The hearing aid according to claim 10, wherein said antenna is a wire or a stamped part produced from a conductive material.

12. The hearing aid according to claim 10, wherein said first arm of said antenna is a ground surface and forms a ground potential, so that said antenna is a monopole antenna with said second arm forming an antenna pole.

13. A method for producing a hearing aid, the method comprising:
- providing a housing with a housing shell to be worn in the ear of a user;
- providing an antenna configured for signal transmission via a radio connection, the antenna being a flexible printed circuit board having a conductor track structure; and
- inserting the antenna into the housing shell such that the antenna extends along an inner side of the housing shell.

* * * * *